(12) United States Patent
Ishizaki

(10) Patent No.: US 7,817,299 B2
(45) Date of Patent: Oct. 19, 2010

(54) IMAGE FORMING APPARATUS

(75) Inventor: Koji Ishizaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1206 days.

(21) Appl. No.: 10/784,179

(22) Filed: Feb. 24, 2004

(65) Prior Publication Data
US 2004/0168130 A1 Aug. 26, 2004

(30) Foreign Application Priority Data
Feb. 24, 2003 (JP) ............... 2003-045793

(51) Int. Cl.
G06K 15/00 (2006.01)
H04N 1/387 (2006.01)
B42D 15/00 (2006.01)

(52) U.S. Cl. ............ 358/1.18; 358/3.28; 358/450; 358/451; 382/284; 382/206; 283/113; 283/183; 283/71; 283/72; 283/73

(58) Field of Classification Search ........ 358/1.12, 358/1.13, 1.15, 1.18, 3.28, 450, 451; 713/176; 382/100, 232, 284, 306; 283/113, 183, 71–74
See application file for complete search history.

(56) References Cited

U.S. PATENT DOCUMENTS

| | | | |
|---|---|---|---|
| 5,950,045 A | 9/1999 | Nomura et al. | |
| 6,185,333 B1 | 2/2001 | Arai et al. | |
| 6,188,490 B1 | 2/2001 | Miyake | |
| 6,301,013 B1 * | 10/2001 | Momose et al. ............ 358/1.15 |
| 6,473,196 B2 | 10/2002 | Usami et al. | |
| 6,590,996 B1 * | 7/2003 | Reed et al. ............... 382/100 |
| 6,650,428 B1 * | 11/2003 | Hernandez ............... 358/1.13 |
| 6,690,843 B1 | 2/2004 | Squilla et al. | |
| 6,728,000 B1 * | 4/2004 | Lapstun et al. ............ 358/1.15 |
| 6,842,262 B1 * | 1/2005 | Gillihan et al. ............ 358/1.15 |
| 6,847,466 B1 | 1/2005 | Gazdik et al. | |
| 6,894,804 B2 | 5/2005 | Nguyen et al. | |
| 6,952,485 B1 * | 10/2005 | Davidson et al. ............ 382/100 |
| 7,027,179 B2 * | 4/2006 | Mori ..................... 358/1.18 |
| 7,046,385 B2 * | 5/2006 | Mori et al. ............... 358/1.15 |
| 7,107,451 B2 * | 9/2006 | Moskowitz ............... 713/176 |
| 7,110,137 B2 * | 9/2006 | Burgess et al. ............ 358/1.18 |

(Continued)

FOREIGN PATENT DOCUMENTS

JP 2000-222159 * 11/2000

OTHER PUBLICATIONS

USPTO Office Action for U.S. Appl. No. 10/316,470, Mar. 31, 2006.

(Continued)

*Primary Examiner*—Twyler L Haskins
*Assistant Examiner*—Dennis Dicker
(74) *Attorney, Agent, or Firm*—Kubotera & Associates LLC

(57) ABSTRACT

In the image forming apparatus, a plurality of pages of data are reduced and created as collected data, and specific information corresponding to a sheet of print medium is created. The collected data and the specific information are edited in a data editing section and transmitted to a printing section. Even when a plurality of the pages of data is printed in a sheet after reduced, the specific information is printed on non-reduced condition, thus making it possible to print the specific information which is easily distinguished.

27 Claims, 13 Drawing Sheets

U.S. PATENT DOCUMENTS

| | | | |
|---|---|---|---|
| 7,142,690 B2 * | 11/2006 | Hyakutake et al. | 382/100 |
| 7,281,209 B2 * | 10/2007 | Nara et al. | 715/255 |
| 7,305,620 B1 * | 12/2007 | Nakajima et al. | 358/1.1 |
| 7,355,741 B2 * | 4/2008 | Ishizaki | 358/1.18 |
| 2001/0008557 A1 * | 7/2001 | Stefik et al. | 380/202 |
| 2003/0202213 A1 * | 10/2003 | Saito | 358/1.18 |

OTHER PUBLICATIONS

USPTO Office Action for U.S. Appl. No. 10/316,470, Sep. 22, 2006.
USPTO Office Action for U.S. Appl. No. 10/316,470, Jun. 20, 2007.

* cited by examiner

| Fixed character | Content |
|---|---|
| 1 | "Confidential" |
| 2 | "Sample" |

| Parameter variables | Content |
|---|---|
| %Document% | Document name |
| %User% | Printing person |
| %Version% | Number of edition |
| %Page% | Current page |
| %TotalPages% | Number of total pages |
| %Date% | Date |
| %Time% | Time |
| %Printer% | Output address |

FIG. 11

IMAGE FORMING APPARATUS

BACKGROUND OF THE INVENTION

1. Field of the Invention

The present invention relates to an image forming apparatus for forming an image for printing print data and specific information.

2. Description of the Related Art

Specific information, such as a pre-designated fixed character string and fixed drawing (hereinafter "water mark"), has been simply overlapped with the print image on each page for printing.

In a conventional image forming apparatus, a document or any other data is created by an application using a host apparatus, such as a personal computer. A graphic image function of the created document is converted to an output suitable for an output device by a graphic device interface. A printer driver generates print data suitable for the output device and transmits the generated output data to an output apparatus (a printing apparatus). When the water mark is required to be printed on a print medium, the water mark stored in the printing apparatus is overlapped with the print data transmitted by the print driver for printing.

In the conventional image forming apparatus, however, when a plurality of pages are reduced to one sheet for printing, each reduced water mark is printed on each reduced page. Therefore, the water mark is printed in fine characters and it becomes difficult to distinguish the water mark.

Primarily, the water mark has a function of watermark. However, in the above method of overlapping the water mark with the print data, the primary function of the watermark, wherein an image is visible through light, cannot be achieved.

Also, when several kinds of documents are printed by a network printer commonly used by a plurality of users, it has been necessary for a user to set his/her own water mark every time of printing in order to efficiently take out his/her own document by the water mark. However, it has been very time-consuming and burdensome work for the user.

In addition, in case of the face-down printing, in which the print medium is output up side down, even if the water mark is printed to identify his/her own document easily, since the water mark is printed on the front face, the print medium is required to be turned over to the front face one by one.

SUMMARY OF THE INVENTION

Accordingly, it is an object of the invention to provide an image forming apparatus capable of printing a plurality of pages of print data after reducing intensively and overlapping a specific mark with the print data.

Another object of the invention is to provide an image forming apparatus capable of printing a specific mark which is mirror-inverted on the print medium.

Still another object of the invention is to provide an image forming apparatus capable of printing a specific mark, which identifies the printing person or the contents of the document, on the back face of the print medium.

Yet another object of the invention is to provide an image forming apparatus capable of using a part of the name of the document as a specific mark.

BRIEF DESCRIPTION OF THE DRAWINGS

FIGS. 11 (a) and 3(b) are tables showing construction examples of a water-mark information storing section according to the first embodiment of the present invention, wherein 11(a) is the storing section for a changeable character string and 11(b) is the storing section for a fixed character string.

DESCRIPTION OF THE PREFERRED EMBODIMENTS

Figure 1:
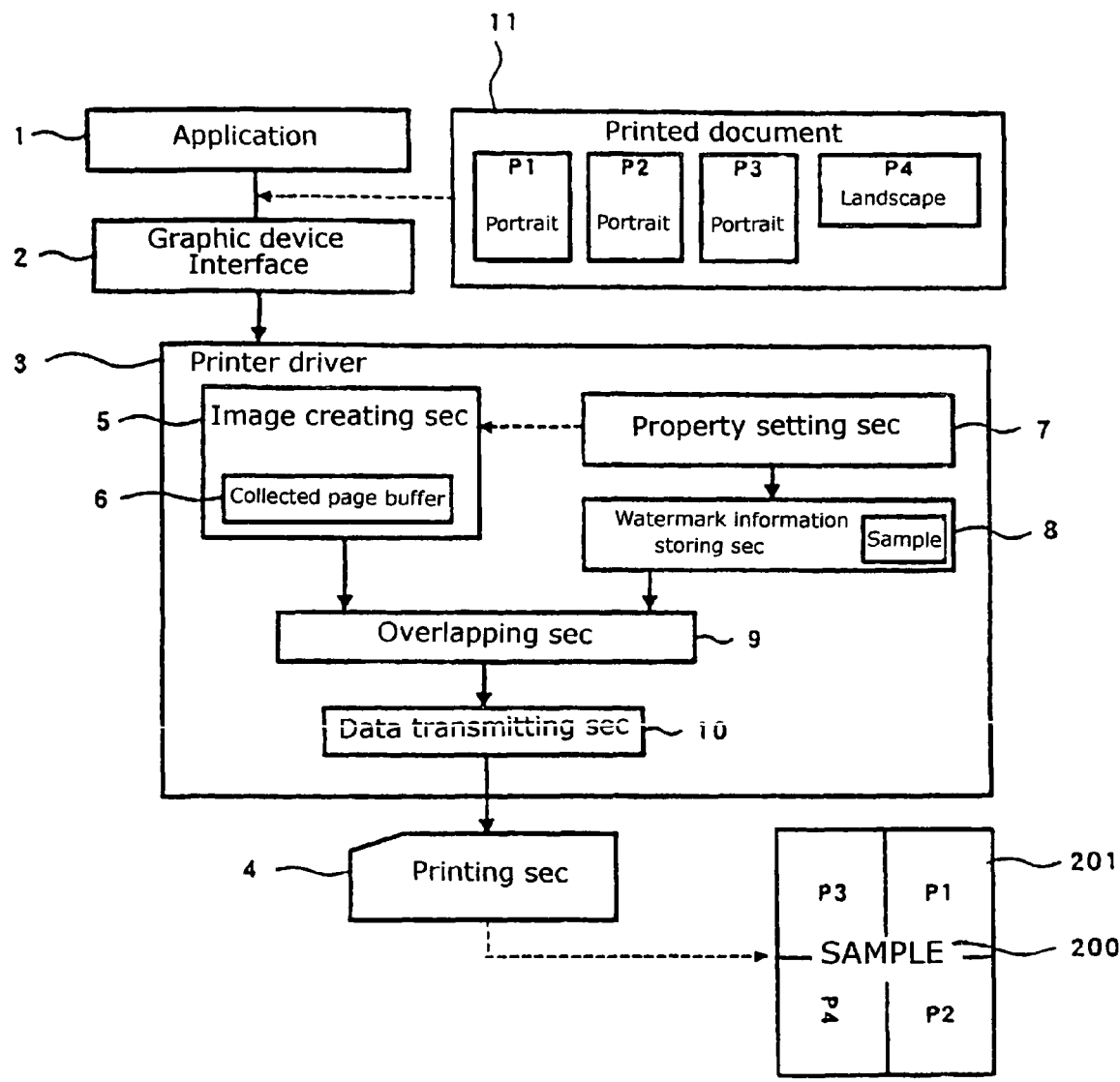
FIG. 1 is a block diagram of an image forming apparatus according to the first embodiment of the present invention.

Embodiments of the present invention will now be described with reference to the accompanying drawings. The same reference numerals are given to elements which are common among the embodiments.

First Embodiment

In the image forming apparatus according to the first embodiment, a plurality of pages are collected to one sheet of print medium and a predetermined specific information, such as a fixed character string and a fixed drawing (hereinafter "water mark"), is printed on every sheet of the print medium.

In FIG. 1, an image forming apparatus according to the first embodiment comprises the following construction.

An application 1 in a host apparatus, such as a personal computer creates a document. A graphic device interface 2 is a module to convert a graphic image function to an output suitable for an output device. A printer driver 3 has a module which generates print data suitable for the output device and transmits the generated print data to a printing section 4. The printing section 4 prints the image of the printed document and a water mark 200 on a print medium 201.

The print driver 3 comprises the following construction.

An image generating section 5 generate bit map data from a graphic image command generated by the graphic device interface 2. A collected page buffer 6 stores the generated bit map data temporarily. A property setting section 7 sets the property of the water mark 200 together with properties of the print medium, such as the size and print orientation of the print medium, and various patterns pre-printed on the print medium as a background. When the property of the water mark is set, a water mark information storing section 8 takes out data necessary for image processing from a pattern memory which stores a font memory (not shown) and data for generating the background patterns. Then, the water mark information storing section 8 generates a bit map data and stores the generated bit map data of the water mark 200 temporarily.

An overlapping section 9 reads out the bit map data of the printed image from the collected page buffer 6 and the bit map data of the water mark 200 from the water mark information storing section 8. Then, the overlapping section 8 overlaps both the bit map data and transmits them to a data transmitting section 10. The data transmitting section 10 transmits the overlapped data to the printing section 4.

Figure 2:
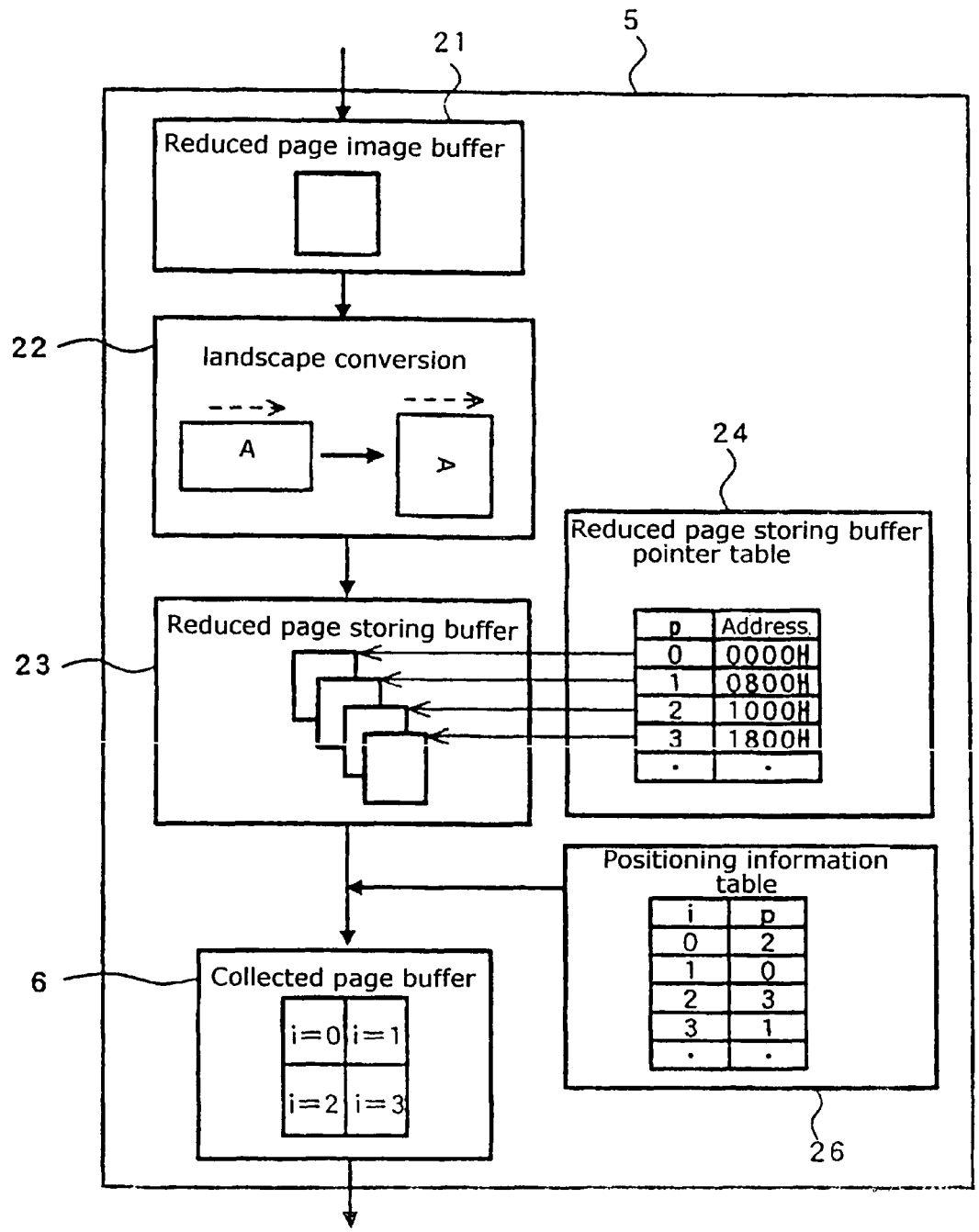
FIG. 2 is a block diagram of an image generating section according to the first embodiment of the present invention.

As shown in FIG. 2, the image generating section 5 comprises a reduced page image buffer 21, a landscape conversion section 22, a reduced page storing buffer 23, a reduced page storing pointer table 24, a positioning information table 26, and the collected page buffer 6.

The reduced page image buffer 21 reduces the printed document according to the number of reduced pages. The landscape conversion section 22 converts a page of oblong landscape image to a lengthy portrait image to make all images lengthy. The landscape conversion section 22 also cuts out data in the right-hand edge of portrait image in the same way as in the of case of landscape image.

The reduced page storing buffer 23 memorizes reduced data of all collected pages. The reduced page storing buffer pointer table 24 arranges and stores pointers representing the top address of each reduced page stored in the reduced page storing buffer 23.

The collected page buffer 6 positions each reduced page in the order of printing and memorizes it. The positioning information table 26 stores an absolute position of each reduced page. The absolute position stored in the positioning information table 26 will be described below with reference to FIG. 3.

Figure 3A:
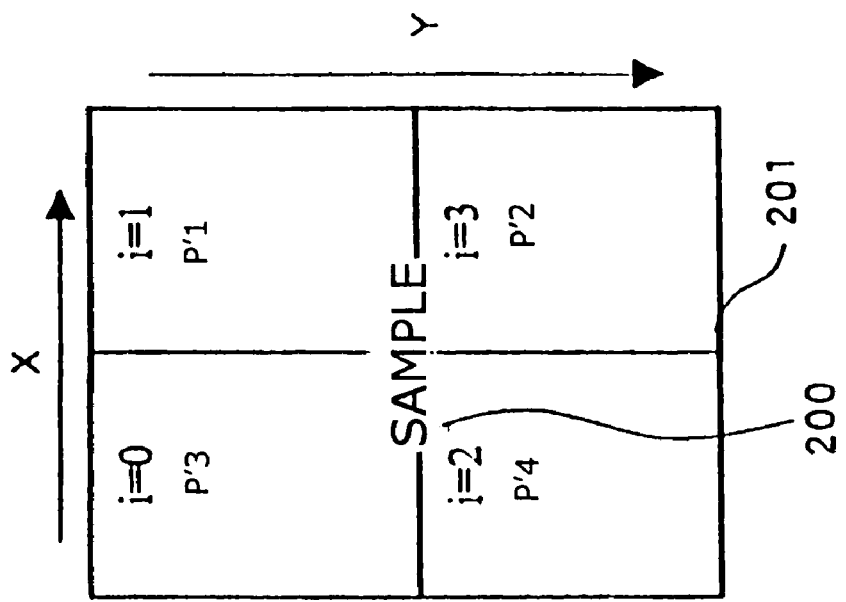
FIGS. 3(a) and 3(b) are tables showing examples of an intensive page including four and sixteen pages, respectively, according to the first embodiment of the present invention.
Figure 3A:
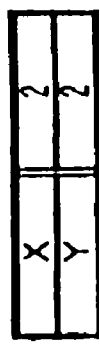
Figure 3B:
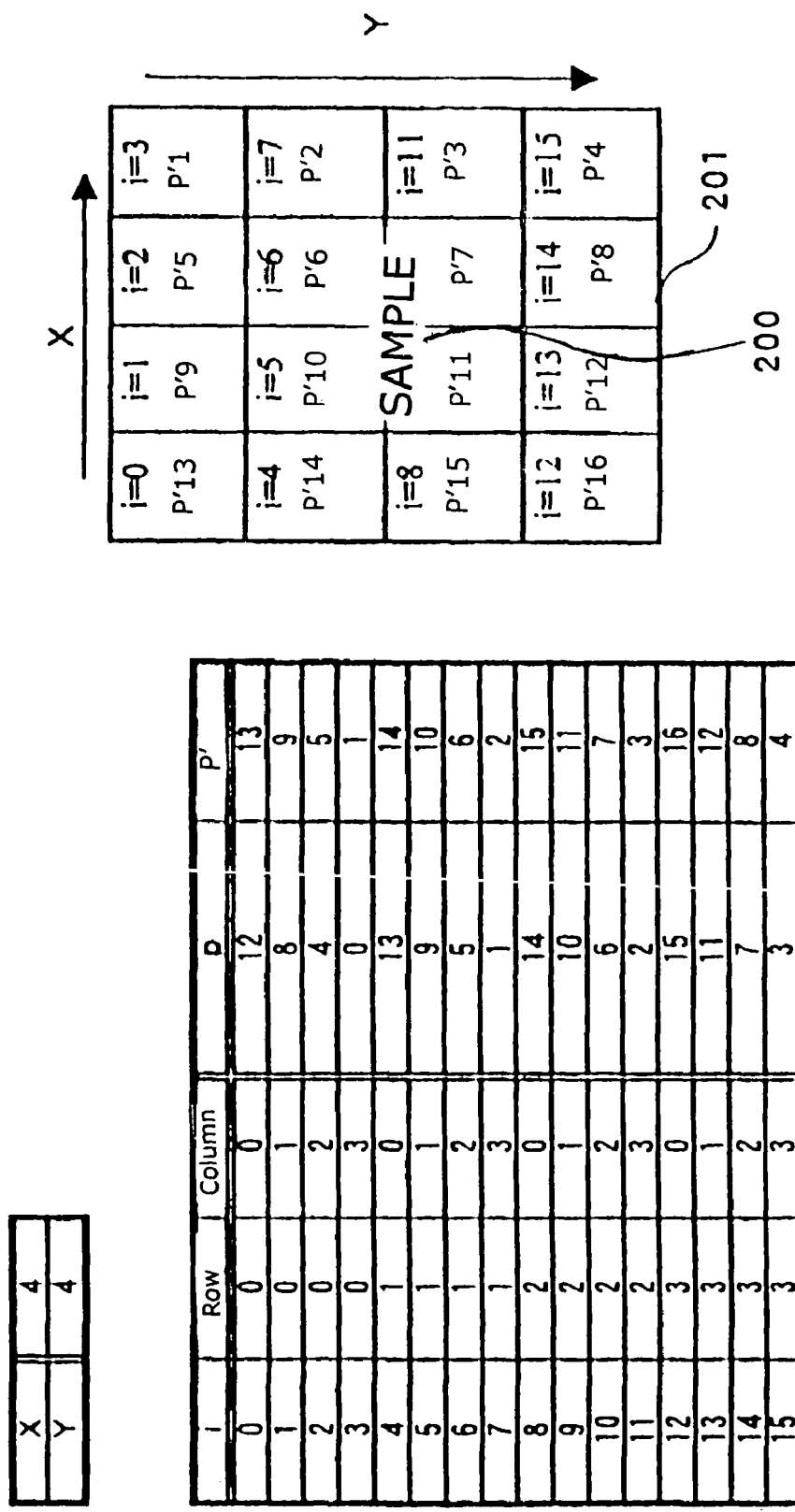

FIG. 3(*a*), in case of collecting four pages to one page, shows the positioning in the order from the upper right to the lower left (in the order of the upper right, lower right, upper left, and lower left). Similarly, FIG. 3(*b*), in case of collecting 16 pages to one page, shows the positioning in the order from the upper right to the lower left.

In FIG. 3(*a*), a reference character X represents the number of collected pages in the horizontal direction and a reference character Y represents the number of collected pages in the vertical direction. A reference character i represents the absolute position and as indicated in the right-side drawing, the absolute position i of each reduced page is i=0 in the upper left, i=1 in the upper right, i=2 in the lower left, and i=3 in the lower right. In the lower left table of FIG. 3(*a*), a reference character R represents the position of page in the raw (X direction) and a reference character C represents the position of page in the column (Y direction).

Here, the reference characters R and C are calculated by the below-mentioned formula and a page number p is calculated using the reference characters R and C as follows.

$$R = \text{an integer number } (i/X), C = \text{the remainder of } i/X \quad (1)$$

$$p = ((X-C-1)*Y) + R \quad (2)$$

The page number p is determined as shown in FIG. 3 from the above formula. For a page number P' of the printed documents, one is added to the page number p.

That is, when X=2 and Y=2, in case of i=0, R and C become 0, respectively, p becomes 2, and p' becomes 3. In case of i=1, R and C become 0 and 1, respectively, p becomes 0, and p' becomes 1. In case of i=2, R and C become 1 and 0, respectively, p becomes 3, and p' becomes 4. In case of i=3, R and C become 1, respectively, p becomes 1, and p' becomes 2.

Similarly, in FIG. 3(*b*), in case of collecting 16 pages to one page, R, C, p, and P' are found from the formula (1) and (2).

With the above construction, the image forming apparatus according to the first embodiment operates as follows. Firstly, printing operation for printing a printed document 11 generated by the application 1 at the printing section 4 will be described.

The printed document 11 is classified page by page and the graphic device interface 2 is called out to create a graphic image which does not depend upon the output device. In response to the call-out, the graphic device interface 2 calls out and makes the printer driver 3 it generate data for outputting each page data of the printed document 11 to the printing section 4. In response to the call out, the printer driver 3 converts the graphic image data of each page of the printed document 11 to bit map data. Also, in case of the landscape image, the print driver 3 converts it to lengthy portrait image and transmits the image to the printing section 4 for printing operation.

In even case of printing the water mark with a plurality of pages of the printed documents 11 collected to one sheet, the application 1 outputs the printed document 11 without considering that the collected pages are arranged in one sheet. The printer driver 3 creates page data reduced for positioning the plurality of pages of the printed documents 11 in one sheet, make the reduced portrait data having the same size as the print medium, creates collected page data by positioning the reduced page data in a predetermined order, and overlap the water mark with the collected page data for printing.

The operation of each section will be described. Firstly, the operation of the property setting section 7 will be explained with reference to FIG. 4.

Step S1: The property setting section 7 begins property setting process.

Step 2: A property setting picture 100 shown in the right of FIG. 4 for controlling the printer driver 3 is displayed on the screen of the personal computer.

Step 3: Information for designating the parameters of the reduction and the form of the water mark is inputted into the display. The information includes on/off setting of the reduction print, a reduction mode indicating the number of division of the print medium, on/off setting of the water mark, resolution of the bit map data of the water mark, character string representing the water mark, rotation angle of the water mark printed on the print medium, and print density.

Step 4: The inputted information items are checked to judge if each item includes an error. The criteria for the error judgement is stored in advance and the inputted data is compared with it. If no error is found, the operation advances to step 5 and when any error is found, the operation goes back to step 3 to input information again.

Step 5: The notice of the parameters of the reduction is given to the image generating section 5 and the bit map data is created according to the form of the water mark and stored in the water mark information storing section 8. The water mark here is printed on one sheet of the print medium and not given to every pages.

Figure 5:
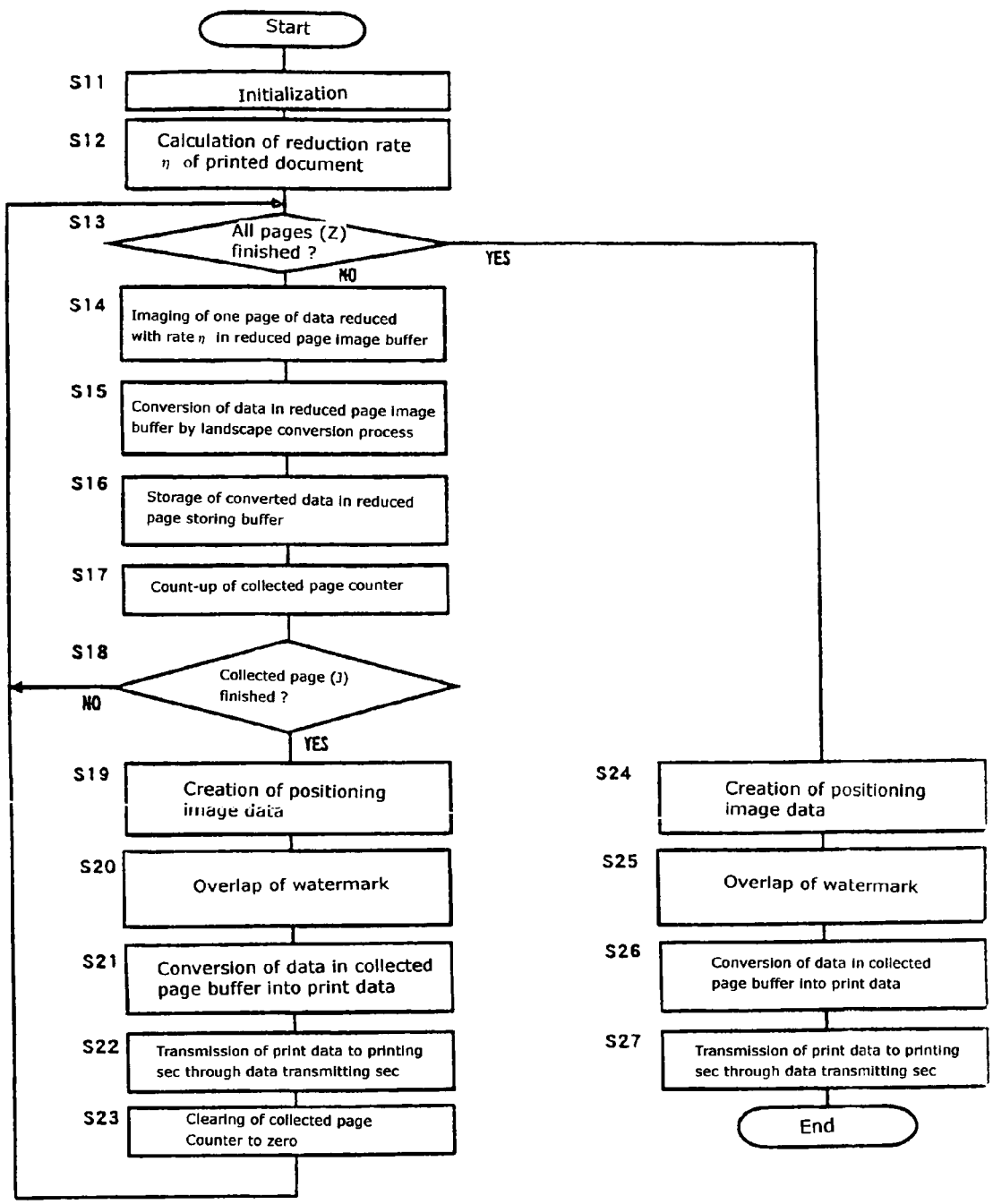
FIG. 5 is a flow chart of an operation of a printer driver according to the first embodiment of the present invention.

The operation of the printer driver 3 will be described with reference to FIG. 5.

Step S11: As an initial operation, the respective buffers, such as the reduced page image buffer 21 shown in FIG. 2, is secured, the pointers of the reduced page storing buffer pointer table 24 are set, the respective buffers and a collected page counter (described later) are cleared to zero, and the page number p to be disposed in the absolute positions is calculated and set in the positioning information table 26.

Here, the page number p corresponding to the absolute position of the positioning information table 26 is calculated as follows. The number J of division of the print medium is found from the reduction mode inputted in the property setting picture 100 (in case that the reduction mode is 1/4 as shown in the property setting picture 100 in FIG. 4, J becomes 4). Then, the number X of pages in the horizontal direction and the number Y of pages in the vertical direction are calculated from the number J of division. Also, the page number p is calculated from the formula (1) and (2) described with respect to FIG. 3.

Naturally, in case of positioning from upper left to lower right (the same order as the absolute position i indicated in the right of FIG. 3) instead of positioning from upper right to lower left shown in FIG. 3, it is not necessary to exchange the positioning of pages so that it becomes unnecessary to calculate the page number p to be positioned in accordance with the absolute position i using the formula (1) and (2) and prepare the positioning information table 26 for storing the page number p.

Step S12: A reduction ratio η for collecting a plurality of pages of the printed document 11 to one sheet is calculated from the designated size of the print medium. The reduction ratio η is calculated by using the following formula when the height and width of the original data of the printed document 11 are H and W, respectively.

$$M = \log 2(J) \quad (3)$$

$$\eta = (W/H)^M \quad (4)$$

Here, as described above, J is the number of division of the print medium inputted in the property setting picture. For example, in case that the print medium is divided into two equal parts (J=2), in order to position two pages as shown in the right of the property setting picture 100 in FIG. 4, the height of the printed document 11 is reduced to the dimension of the width W and the two pages are turned by 90 degrees. Accordingly, the reduction ratio η is calculated with the formula η=W/H. When J=4, the height H of the printed document 11 is reduced to the dimension of the width W again and the reduced documents are turned by 90 degrees so that the reduction ratio η is calculated with the formula η=W/H^2. Similarly, when J=8, the reduction ratio η is calculated with the formula η=W/H^3. That is, reference character M representing how many times the print medium is divided into two parts is calculated with the formula (3) and the reduction ratio η is calculated with the formula (4).

In case of division into the number of division other than 2, for example, in case of division into 9, the formula (3) and (4) cannot be used. Accordingly, if the reduction ratio η corresponding to the number of division is calculated in advance (for example, in case of division into 9, the reduction ratio η is 1/3=0.333) and stored, the necessary reduction ratio η which corresponds to the number of division of the print medium inputted in the property setting picture can be taken out when printing.

Step S13: Whether all pages (Z pages) of the printed document 11 have been printed is judged. If the printing has not been completed, the operation advances to step S14 and when the printing has been completed, the operation goes back to step S24.

Step S14: The respective pages of the printed document 11 are reduced according to the reduction ratio η calculated in step 12 and the bit map data is created so that the reduced pages are imaged onto the reduced page image buffer 21.

Step S15: In case that the data in the reduced page image buffer 21 is the landscape data (oblong type), the landscape conversion section 22 converts it to the portrait data (lengthy type).

Step S16: The data converted in step S15 is stored in an address in the reduced page storing buffer 23 stored in the pointer of the reduced page storing buffer pointer table 24 shown in FIG. 2, wherein the address corresponds to the count of the collected pages. For example, when the first page is stored, the count of the collected pages is 0 and the address stored in the pointer is 0000H. The converted data is stored from the address 0000H in the reduced page storing buffer 23. Similarly, in case of the second page, the count of the collected pages is increased to 1 in the next step S17 so that the converted data is stored from the address 0800H in the reduced page storing buffer 23.

Step S17: When one page has been stored, the count of the collected pages is up by 1.

Step S18: Whether all the number J of the reduced pages have been stored in one sheet is judged with reference to the number of the count of the reduced pages. If the storing has not been completed, the operation goes back to step S13 and the same steps are repeated. When the storing has been completed, the operation advances to step S19.

Step S19: When the process of all the pages J to be collected in one sheet in step S18 is judged to be completed, the page number p corresponding to the absolute position i in the positioning information table 26 is read out in order, the value (address) of the pointer in the reduced page storing buffer pointer table 24, which corresponds to the page number, is read out, the reduced page data in the reduced page storing buffer 23 stored in the pointer value (address) is read out line by line and stored in the collected page buffer 6 in order.

For example, in case of division into 4, when the collected page is created from the absolute position i=0, as shown in the positioning information table 26 in FIG. 2, the page number p=2 is read out because p=2 corresponds to i=0. Then, as shown in the reduced page storing buffer pointer table 24, the address 1000H is read out because the address 1000H corresponds to p=2. Then the reduced page data stored in the address 1000H in the reduced page storing buffer 23 is read out and stored in the position of i=0 in the collected page buffer 6.

When the absolute position i=1, the page number p=0, which corresponds to i=1 in the positioning information table 26, is read out, the address 0000H, which corresponds to p=0 in the reduced page storing buffer pointer table 26, is read out, the reduced page data stored in the address 0000H in the reduced page storing buffer 23 is read out and stored in the position of i=1 in the collected page buffer 6. This process is performed for all the number J of the collected pages.

Figure 4:
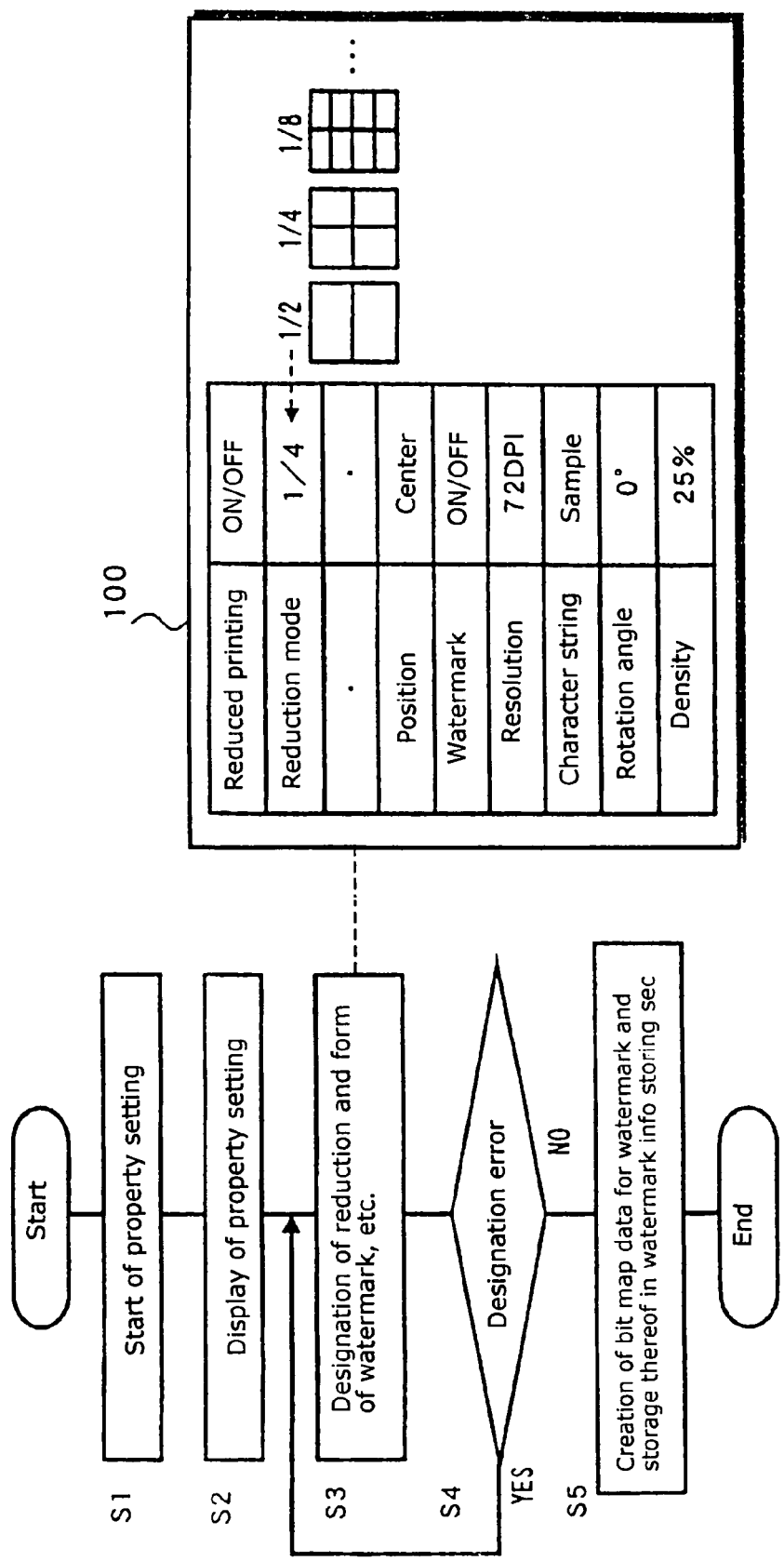
FIG. 4 is a flow chart of an operation of a property setting section according to the first embodiment of the present invention.

Step S20: The water mark 200 created and stored in the water mark information storing section 8 in step S5 in FIG. 4 is overlapped with the reduced page data stored in the collected page buffer 6 and then imaged. Although not shown in FIG. 4, when "OFF" is selected in the water mark ON/OFF option in the property setting picture in FIG. 4, the process of overlapping the water mark 200 is skipped.

The positioning of the water mark 200 is performed by reading out the positioning information which is set in the property setting picture 100. In FIG. 1, the center is set as the position. For the positioning, "lower right", "lower left", "upper right", and "upper left" may be set or other setting, such as "in the first page" or "in the second page", may be accepted. The positioning by inputting X and Y coordinates with the reference point of the lower left of the print medium is also acceptable.

Step S21: The data in the collected page buffer 6 is converted to print data.

Step S22: The print data is transmitted to the printing section 4 under the control of the data transmitting section 10 and printed as shown in the lower left of FIG. 1.

Step S23: The collected page count is cleared to zero and the operation goes back to step S13 and the same process is repeated until all pages of the printed document are completed.

When it is judged in step S13 that all pages are completed, the operation jumps to step S24 and the remaining pages are subject to steps S24 to S27, which is identical to steps S19 to S22. In steps S24 to S27, such a part in which the reduced page data is not created, is processed as NULL image, which represents no data.

By the operations described above, all pages of the printed document are reduced according to the setting of the reduction mode and the water mark created for every sheet of the print medium is overlapped for the printing.

As fully described above, in the image forming apparatus according to the first embodiment, after a plurality of pages of the print data are reduced, the water mark is overlapped with the reduced data so that even when the data is printed with reduction in one sheet, the water mark is printed without reduction. Accordingly, the printed water mark can be easily distinguished.

In the above description, the water mark is explained as a character string which is set in the property setting picture 100. However, the name of the document or a specific character string in the document can be made the water mark.

When the water mark is already present in the page before reduction, such a water mark can be used. Also, the water mark is present in each page, it is possible to select which water mark should be used.

In addition, not only the density but also the color of the water mark can be set in the property setting picture 100.

Second Embodiment

In the image forming apparatus according to the second embodiment, the water mark, which is mirror-inverted, is printed on the back of the sheet of the print medium.

Figure 6:
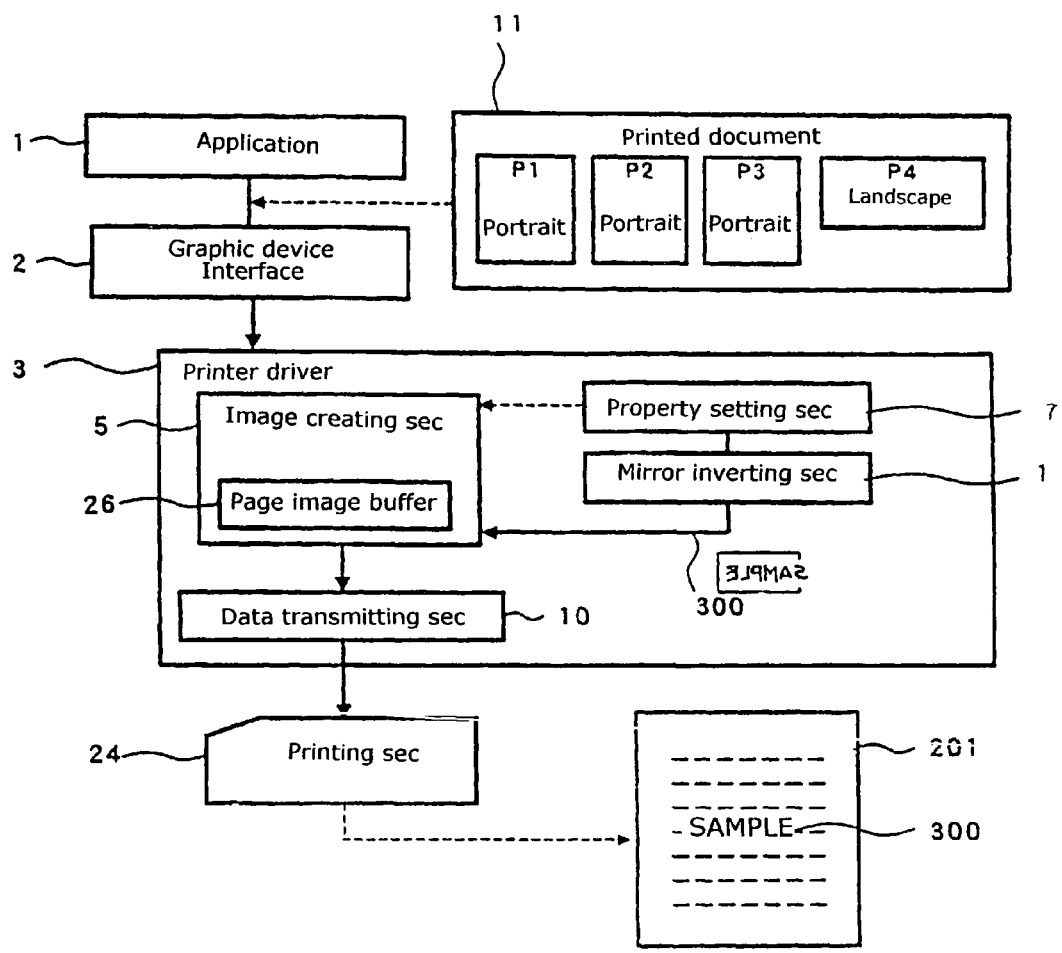
FIG. 6 is a block diagram of an image forming apparatus according to the second embodiment of the present invention.

As shown in FIG. 6, in the image forming apparatus according to the second embodiment, the print data is transmitted to the printing section capable of perfect (double sides) printing. An mirror inverting section 12, which mirror-inverts the water mark, is connected to the property setting section 7 and the output of the mirror inverting section 12 is connected to the water mark information storing section 8. The other sections are similar to those in the first embodiment and the description thereof is omitted.

Figure 7:
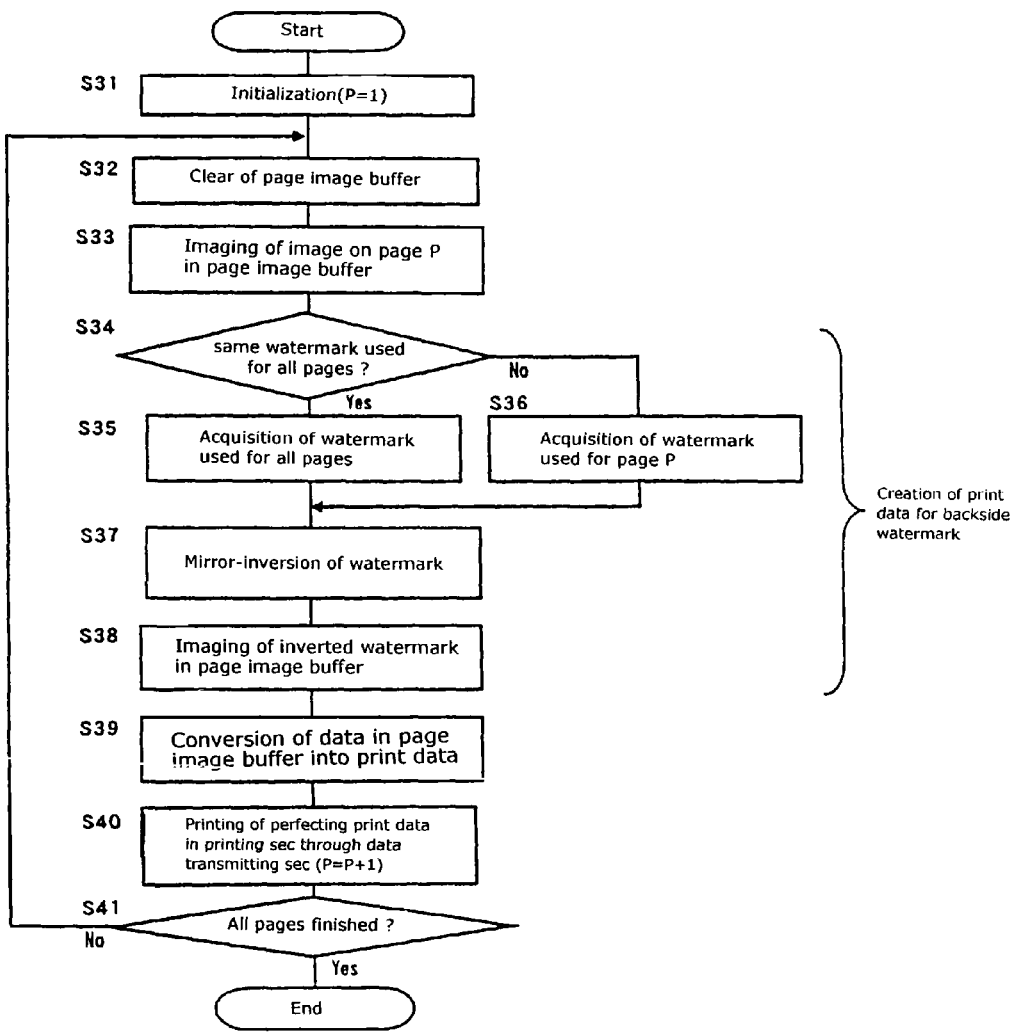
FIG. 7 is a flow chart of an operation of a printer driver according to the second embodiment of the present invention.

The image forming apparatus according to the second embodiment operates as described below. The overall operation of printing the printed document 11 created by the application 1 is similar to that in the first embodiment and, therefore, the description thereof is omitted. The operation of the printer driver 3 will now be described with reference to FIG. 7.

In the property setting section 7 of the second embodiment, the option is prepared to select whether or not the same water mark is used in all pages, and when it is selected that the same water mark is not used in all pages, it is possible to set the water mark page by page, which is printed on the back of each page, and set the printing position of the water mark, such as an upper end, lower end, left end, right end, or center.

Step S31: The initial operations, such as securing the respective buffers like the page image buffer 26 and initializing the page counter P, is performed.

Step S32: The page image buffer 26 is cleared.

Step S33: The bit map data of P page of the printed document 11 is imaged in the page image buffer 26.

Step S34: It is judged from the information set in the property setting section 7 whether or not the same water mark is used in all pages. If the same water mark is used, the operation advances to step S35 and if not, the operation goes to step S36.

Step S35: The water mark, which is common to all pages, is taken out from the property setting section 7. Although not shown, even in case that the same water mark is used in all pages, when the print data of the water mark to be printed on the back has been already created, it is not necessary to create the print data of the water mark again so that the operation skips steps S35 and S37.

Step S36: When the same water mark is not used, that is, it is selected that different water marks are used page by page, the water mark, which corresponds to the current page P, is take out from the property setting section 7.

Step S37: The bit map data of the taken-out water mark is created according to the resolution and angle designated in the property setting section 7 and mirror-inverted in the mirror inverting section 12.

Step S38: The mirror-inverted data is temporarily imaged in the page image buffer 26 as a water mark 300.

Step S39: The water mark 300 is converted into print data.

Step S40: The bit map data of the page P of the printed document created in step S33 and the print data of the water mark are transmitted, as the front and back data, respectively, through the data transmitting section 10 to the printing section 24 capable of perfect printing and then, printed. Then, the page counter P is counted up.

Step S41: It is judged with reference to the page counter P if all pages are completed. When it is judged that all pages are not completed, the operation goes back to step S32 and the same process is repeated. When it is judged that all pages are completed, the printing operation is finished.

Figure 8:
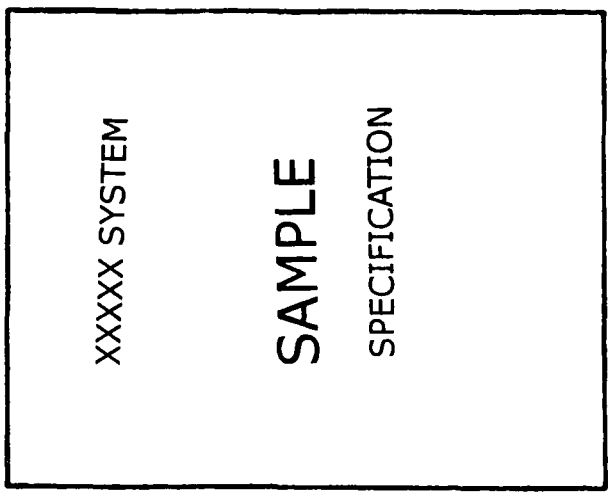
FIG. 8 is an illustration showing print examples by a printing section according to the second embodiment of the present invention.
Figure 8:
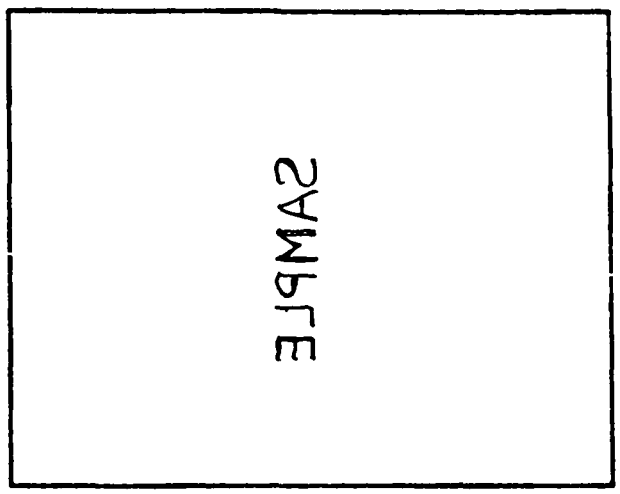
Figure 8:
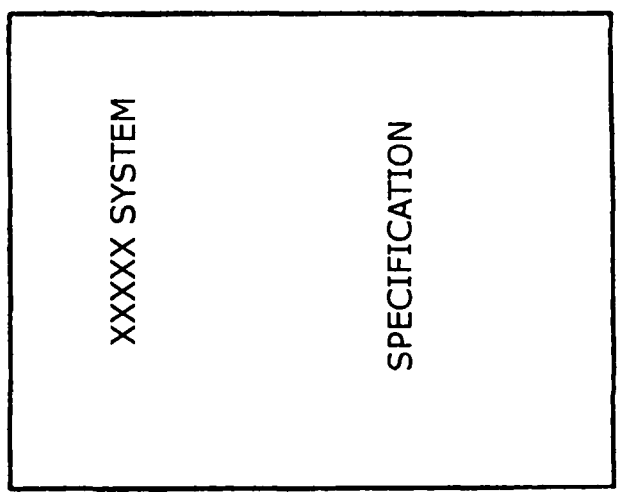

An example of print output according to the second embodiment is shown in FIG. 8. In FIG. 8(a), the content of the printed document is printed on the front face and in FIG. 8(b), the mirror-inverted water mark 300 is printed on the back face. When the water mark 300 is looked through from the front side, the water mark 300 is seen in the form before mirror-inversion as shown in FIG. 8(c). Accordingly, the water mark 300 functions as a watermark.

In the description above, the water mark 300 is printed on every pages of the printed document. However, the water mark 300 may be used for the first embodiment too, that is, the water mark 300 may be printed on the page in which a plurality of pages of the printed document are reduced and collected.

As described above, in the image forming apparatus according to the second embodiment, the mirror inverting section is provided to mirror-invert the water mark and the mirror-inverted water mark is printed on the back of the print medium so that the water mark functions as a watermark.

Third Embodiment

In the image forming apparatus according to the third embodiment, the water mark identifying the printed document or printing person is printed on the back of the sheet of the print medium using the printing section capable of perfect printing.

Figure 9:
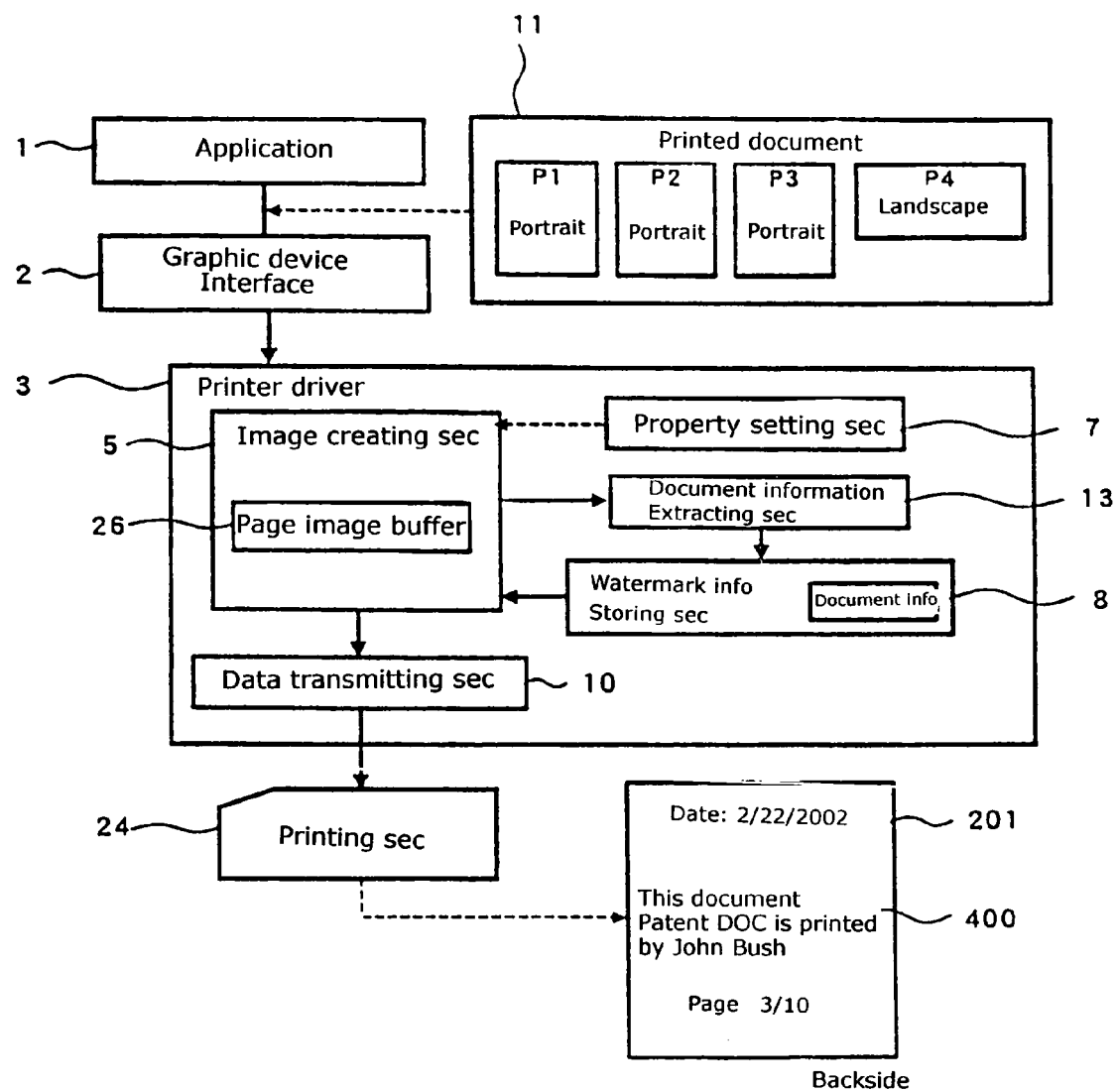
FIG. 9 is a block diagram of an image forming apparatus according to the third embodiment of the present invention.

In the image forming apparatus according to the third embodiment shown in FIG. 9, a document information extracting section 13 is added to the construction of the image forming apparatus of the first embodiment.

In FIG. 9, the property setting section 7 is connected to the image generating section 5, the output of the image generating section 5 is connected to the document information extracting section 13, the output of the document information extracting section 13 is connected to the water mark information storing section 8, and the output of the water mark information storing section 8 is connected to the image generating section 5. The other sections are similar to those of the image forming apparatus of the second embodiment and the description thereof is omitted.

The image forming apparatus according to the third embodiment operates as described below. The overall operation of printing is similar to that in the first embodiment and, therefore, the description thereof is omitted. Only the operation of creating the print data of the water mark to be printed on the back in the printer driver 3 (steps S57 to S59) will now be described with reference to FIG. 10.

In the initializing operation (step 51) of the third embodiment, the page image buffer is secured, the page counter is cleared, and the document information is extracted from the document information extracting section 13 and stored in the water mark information string section 8. The document information includes the names of the document and printing person and the date and number of pages, which are usually set when the printed document is created and stored.

The water mark information storing section 8 is, as shown in FIG. 11, composed of the variable character string storing section and the fixed character string storing section. The variable character string means information which is changed page by page or document by document and includes, for example, the names of the document and printing person (user), the edition number of the document, the number of current page, the number of total pages, and printing date. The fixed character string includes, for example, fixed characters which are fixed in a series of the printed document, such as "confidential" and "sample".

When used as the water mark, the portion replaced with the character string is defined as such parameter variables as shown in FIG. 11(a). For example, it is set like "date % Date % CRLF this document % Document % is printed by % User % CRLF page % Page %/% TotalPages %", wherein CRLF is characters for control, meaning a new line.

Figure 10:
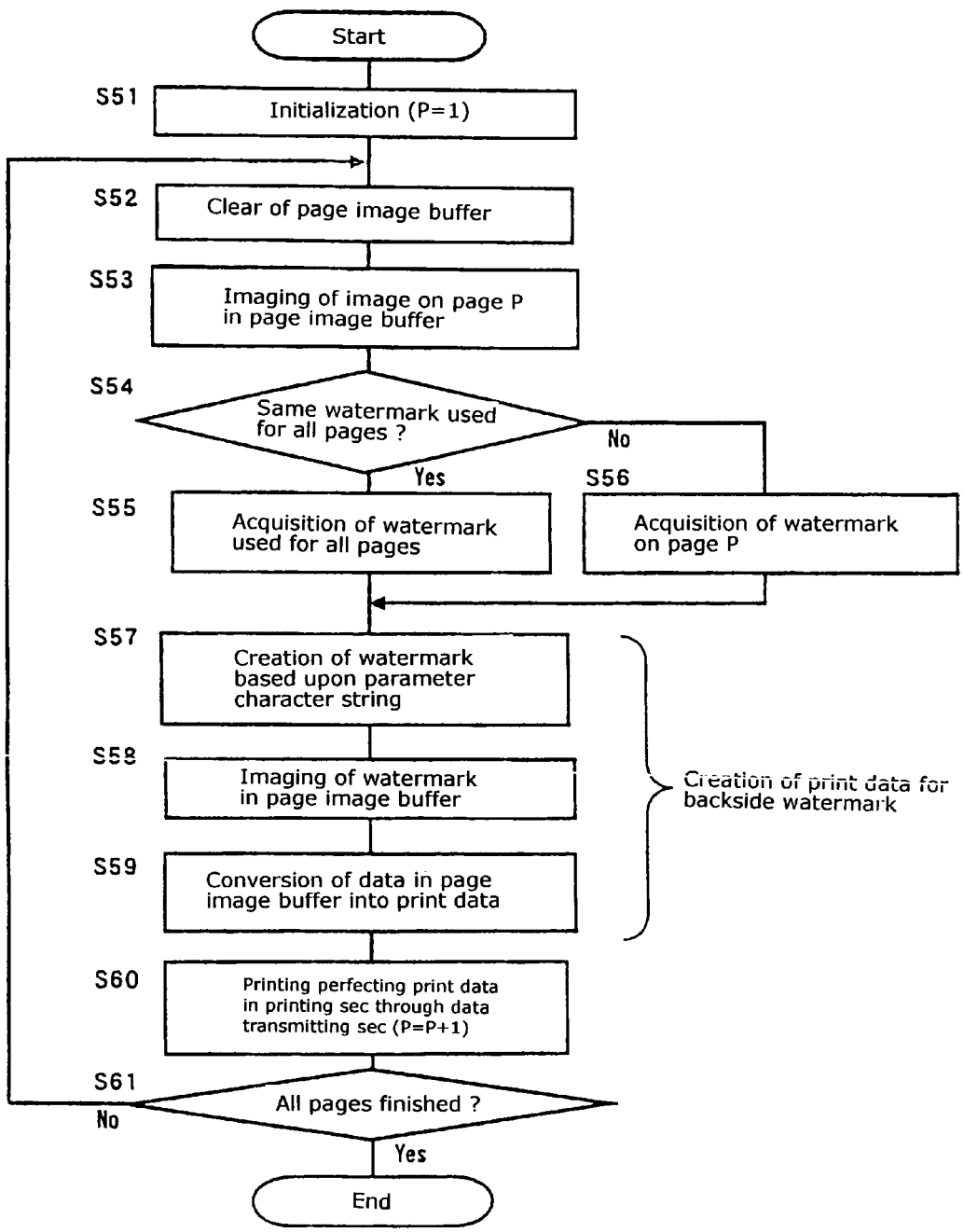
FIG. 10 is a flow chart of an operation of a printer driver according to the third embodiment of the present invention.

Back to FIG. 10, steps S52 and S53 are similar to those of the second embodiment and the steps of creating the bit map data of the printed document page by page and storing it in the page image buffer 26, respectively.

Step S55: It is judged from the information set in the property setting section 7 whether or not the same water mark is used for all pages. When the same water mark is used for all pages, the water mark which is common to all pages is taken out.

Step S56: When different water marks are used page by page, the water marks for the respective pages are taken out.

Step S57: The document information extracting section 13 analyzes the property information of the printed document and creates the water mark, applying the variable character string corresponding to the parameter variable or creates the water mark according to the fixed character string.

Step S58: The water mark is imaged in the page image buffer 26.

Step S59: The imaged water mark is converted to the print data.

The afterward steps (steps S60 and S61) are similar to those of the second embodiment.

By the above operations, for example, when "Feb. 22, 2002", "patent DOC", "John Bush", and "3/10" are extracted for parameter variables % Date %, % Document %, % User %, and % Page %/% TotalPages %, respectively, the water mark is printed as shown in the lower right in FIG. 9. If using a printer which outputs the sheet with the front face up, the water mark is printed on the front face.

In the above description, the water mark identifying the names of the document and the user or any other information is printed page by page of the printed document. Similarly, the water mark may be printed for the first embodiment, wherein a plurality of pages are collected and printed in one sheet. In this case, the way of printing the number of page is different and if 4 pages are collected, for example, it is printed like "page 5-8/10" on the second page.

As described above, in the image forming apparatus according to the third embodiment, when the printer is capable of perfect printing and outputs the sheet of print medium with the front face down, the character information extracting section is provided to extract the water mark identifying the printed document and/or user and print it on the back of the print medium so that the printed document and/or user can be identified without turning over the outputted sheet. Also, since the variable character string, such as the names of the document and user, can be expressed as the parameter variables, the operator can print any water mark without setting it every time of printing.

Fourth Embodiment

In the image forming apparatus according to the fourth embodiment, the name of the document is analyzed and the water mark is automatically taken out for printing.

The image forming apparatus according to the fourth embodiment has the same construction as that of the third embodiment shown in FIG. 9. The printing section 24 is not required to have the function of perfect printing. The other sections are similar to those of the third embodiment and the description thereof is omitted.

Figure 12:
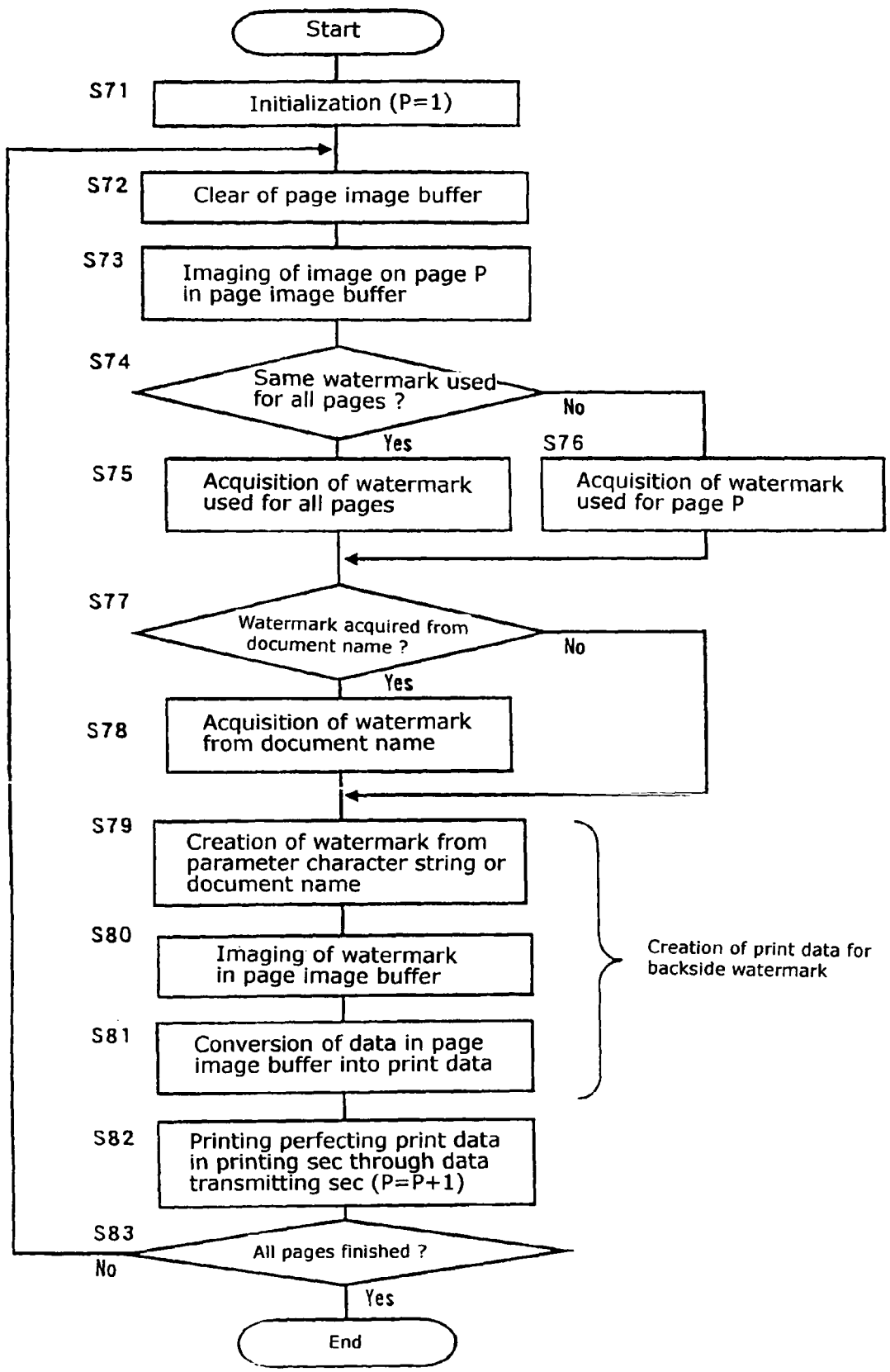
FIG. 12 is a flow chart of an operation of a printer driver according to the fourth embodiment of the present invention.

The image forming apparatus according to the fourth embodiment operates as described below. Overall printing operation is similar to that of the first embodiment. However, the operation of the printer driver 3, which is described in steps S77 to S79 in FIG. 12, is different from the operation of the third embodiment in FIG. 10. Only the different operation is described in detail.

The operation from step S71 to S76 is similar to the operation of the third embodiment described in step S51 to S56. That is, the steps including the initialization, clearing of the page image buffer, imaging of the respective pages in the page image buffer, judgement whether or not the water mark common to all the pages is used, using the common water mark, and using the water mark in every pages, are similar to the third embodiment.

Step S78: The name of the document is analyzed to extract the water mark. For example, in case that the document name is "patent <draft> DOC" or "patent <1.1 edition> DOC" instead of "patent DOC", the characters in < > are set to be extracted as the water mark so that "draft" or "1.1 edition" is automatically extracted as the water mark in the printed document. Here, any characters may be used for the water mark, if they are not unusual or they are not characters which cannot be used as a file name by the limitation of OS (e.g. "/").

Step S79: The data of the water mark is created. The property information of the printed document is analyzed so that any one of the variable character string corresponding to the parameter variables, the fixed character string set in the property setting section 7, and the character string extracted from the document name in step S78 is selected as the water mark, or these character strings are compounded as the water mark. The print data is created according to the water mark produced as described above.

The afterward steps S80 to S83 are similar to steps S58 to S61 of the third embodiment.

Through the above steps, for example, in case of "patent <draft>DOC", "draft" which is automatically extracted from the document name is added to the water mark including the names of the document and user, date, time, and so forth. The water mark is printed in every printed pages. Accordingly, the water mark, which identifies the draft document by <draft>, can be printed without designating "draft" in the property setting section 7 every time.

In the above description, the water mark is generated from the parameter variables or the document name in step S79. However, if the water mark is extracted only from the document name, steps S74 to S77 may be skipped and the water mark may not be designated in the property setting section 7.

The above is an example of printing the water mark on every pages of the printed document. However, the water mark can be printed in the sheet in which a plurality of pages are collected as described in the first embodiment.

As described above, in the image forming apparatus according to the fourth embodiment, the document information extracting section is provided to automatically extract the water mark included in the document name for printing so that it is not necessary to designate the water mark in the property setting section 7 every time.

(Other Modifications)

In the above embodiments, the creation of the water mark, the mirror inversion and the storing of the data are performed in the printer driver 3. However, these works may be performed in the printing sections 4 and 24.

As fully described, according to the image forming apparatus of the present invention, since after a plurality of pages of the printed data are reduced, a specific mark is overlapped, even when a plurality of the pages of the printed data are printed in one sheet, the specific mark is printed under non-reduced condition. Accordingly, the specific mark is easily identified.

Also, according to another embodiment, a mirror inverting section is provided to print a specific mark, which is mirror-inverted, on the back of the print medium so that the specific mark functions as a watermark.

In addition, when using a printer capable of perfect printing and outputting the sheet of print medium with the front face thereof down, a document information extracting section is provided to extract a specific mark identifying the printed material and printing person and print it on the back of the sheet so that the printed material and the printing person can be identified without turning over the sheet.

The invention claimed is:

1. An image forming apparatus comprising:
   a data collecting section to reduce data of a plurality of pages and create collected data collected in one single medium;
   a specific information creating section to create specific information applied to the one single medium, said specific information excluding line information; and
   a data editing section to overlap said specific information with said collected data so that one single image of the specific information is printed over at least two of the pages.

2. The image forming apparatus according to claim 1, which further comprises a setting section to set a parameter according to which said specific information is created.

3. The image forming apparatus according to claim 2, wherein said setting section sets a character string of said specific information.

4. The image forming apparatus according to claim 2, wherein said setting section sets a position for overlapping said specific information with said collected data.

5. The image forming apparatus according to claim 2, wherein said setting section sets a rotation angle when overlapping said specific information with said collected data.

6. The image forming apparatus according to claim 2, wherein said setting section sets a color of said specific information.

7. The image forming apparatus according to claim 2, wherein said setting section sets a density of said specific information.

8. The image forming apparatus according to claim 1, wherein said specific information is data which corresponds to one of said plurality of pages.

9. An image forming apparatus comprising:
   an image creating section to create image data of a plurality of pages;
   a specific information creating section to create specific information overlapped with said image data so that one single image of the specific information is printed over at least two of the pages;
   a specific information inverting section to invert said specific information; and
   a data transmitting section to output said specific information inverted in said, specific information inverting section and said image data.

10. The image forming apparatus according to claim 9, wherein said inverted specific information and said image data are created as data which are printed on front and back faces of a sheet of print medium, respectively.

11. The image forming apparatus according to claim 9, wherein said image creating section is capable of reducing the image data of the pages and creating collected data collected in one single medium.

12. An image forming apparatus comprising:
   an image creating section to create image data of a plurality of pages from document data;
   a document information extracting section to extract document information from said document data;
   a specific information creating section to create specific information from said document information extracted by said document information extracting section, said specific information being overlapped with said image data so that one single image of the specific information is printed over at least two of the pages, said specific information excluding line information; and
   a data transmitting section to output said specific information and said image data.

13. The image forming apparatus according to claim 12, wherein said extracted specific information and said image data are created as data which are printed on front and back faces of a sheet of print medium, respectively.

14. The image forming apparatus according to claim 12, wherein said image creating section is capable of reducing the image data of the pages and creating collected data collected in one single medium.

15. The image forming apparatus according to claim 12, wherein said document data has a 'specific symbol for extracting said document information.

16. The image forming apparatus according to claim 12, wherein said document information is data which can identify a printing person.

17. The image forming apparatus according to claim 1, wherein said data collecting section reduces the data of the pages at a first reduction rate, said specific information creating section creating the specific information at a second reduction rate different from the first reduction rate.

18. The image forming apparatus according to claim 11, wherein said image creating section reduces the image data of the pages at a first reduction rate, said specific information creating section creating the specific information at a second reduction rate different from the first reduction rate.

19. The image forming apparatus according to claim 14, wherein said image creating section reduces the image data of the pages at a first reduction rate, said specific information creating section creating the specific information at a second reduction rate different from the first reduction rate.

20. The image forming apparatus according to claim 1, wherein said data collecting section is arranged to create the collected data at a first reduction rate, said specific information creating section creating the specific information at a second reduction rate different from the first reduction rate.

21. An image forming apparatus comprising:
a data collecting section to reduce data of a plurality of pages and create collected data collected in one single medium;
a specific information creating section to create specific information applied to the one single medium, said specific information including a character string; and
a data editing section to overlap said specific information with said collected data so that one single image of the specific information is printed over at least two of the pages.

22. The image forming apparatus according to claim 21, which further comprises a setting section to set a parameter according to which said specific information is created.

23. The image forming apparatus according to claim 22, wherein said setting section sets a position for overlapping said specific information with said collected data.

24. The image forming apparatus according to claim 22, wherein said setting section sets a rotation angle when overlapping said specific information with said collected data.

25. The image forming apparatus according to claim 22, wherein said setting section sets a color of said specific information.

26. The image forming apparatus according to claim 22, wherein said setting section sets a density of said specific information.

27. The image forming apparatus according to claim 21, wherein said specific information is data which corresponds to one of said plurality of pages.

\* \* \* \* \*